Feb. 9, 1954  R. I. KAUFMAN  2,668,465
PNEUMATIC VISE HAVING FIXED JAW LOCATED BETWEEN
MOVABLE CYLINDER AND MOVABLE JAW
Filed July 24, 1952
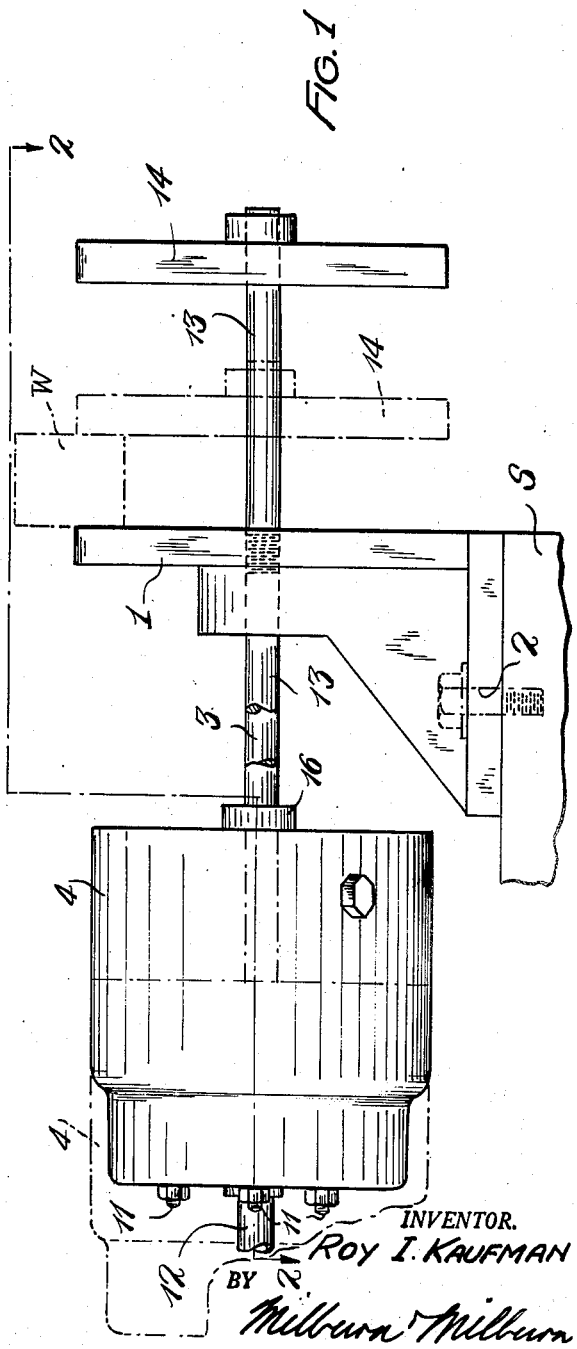
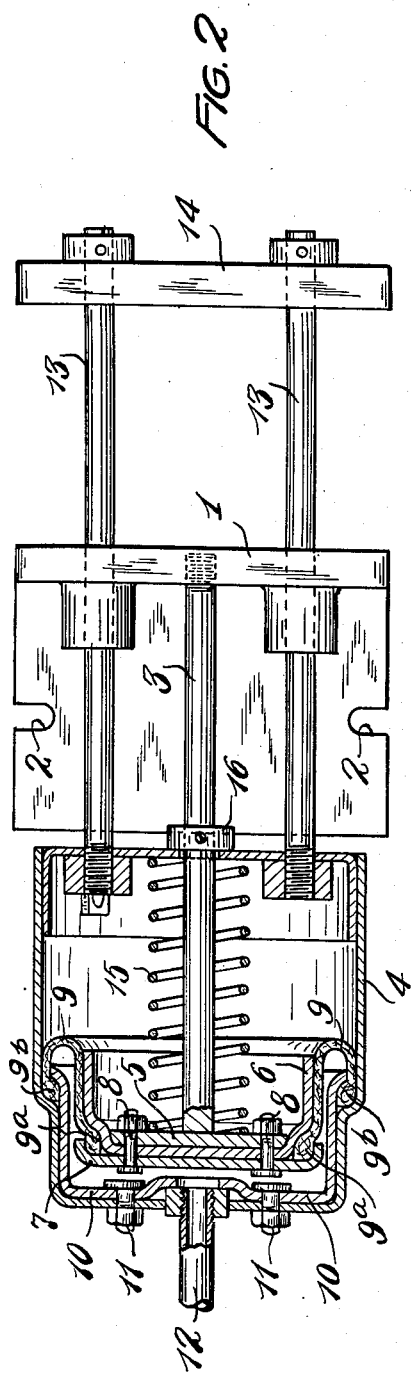
INVENTOR.
Roy I. Kaufman
BY
Milburn & Milburn
ATTORNEYS Patented Feb. 9, 1954

2,668,465

UNITED STATES PATENT OFFICE 2,668,465

PNEUMATIC VISE HAVING FIXED JAW LOCATED BETWEEN MOVABLE CYLINDER AND MOVABLE JAW

Roy I. Kaufman, Marion, Ohio, assignor to R. I. K., Incorporated, Marion, Ohio, a corporation of Ohio Application July 24, 1952, Serial No. 300,589

6 Claims. (Cl. 81—17.2)

1

This invention relates to the general art of appliances, more particularly vises, in which there is employed pneumatic means for effecting clamping engagement upon the work.

One object of my present invention is to devise such an appliance with an improved arrangement of pneumatic means for effecting relative movement between the jaws thereof.

Another object is to devise such an appliance in which one of the jaws is stationary and the other jaw is movable towards and from the stationary jaw and in which there is provided an improved arrangement of pneumatic means for effecting movement of the movable jaw.

Another object is to devise such an appliance in which one of the jaws is provided with an improved arrangement of pneumatic means for moving the same towards and from the other jaw, which is stationary, and in which the movable jaw has its supporting means extending through the stationary jaw for maintaining proper alignment thereof.

Another object is to devise such an appliance that is adapted to be readily mounted upon various machines for use therewith and with marked advantages.

Another object is to devise such an appliance that can be quickly installed, removed and dismantled.

Another object is to devise such an appliance that is so constructed and arranged that there will be no interference by the chips from the work being processed or from the discharge of the pieces of finished work therefrom.

Another object is to devise such an appliance that is capable of efficient, dependable and comparatively inexpensive operation over a long period of time.

Another object is to devise such an appliance in which the pneumatic means for operating the movable jaw is located upon the opposite side of the fixed jaw from its work-engaging face.

Other objects will appear from the following description and claims when considered together with the accompanying drawing.

Fig. 1 illustrates my present improved appliance in elevation, parts being broken away; and Fig. 2 is a plan view, partly in section, as taken on line 2—2 of Fig. 1.

It is to be understood that the present form of disclosure is merely for the purpose of illustration and that there might be devised various modifications thereof without departing from the spirit of my invention as herein set forth and claimed.

2

Referring now to the accompanying drawing in detail, a jaw 1 of my present vise is fixedly mounted, as for instance at points 2, upon a suitable support S. Extending rearwardly from the central point of the fixed jaw 1 is a rod 3 which extends through the front wall of a chamber 4 and has connected at its end a disk 5. The disk 5 has an annular cup-shaped portion 6 that is clamped between the disk 5 and a companion disk 7 by means of bolts 8, the disks 6 and 7 being so formed at their marginal edge portions as to receive and to hold securely and hermetically an enlarged inner edge portion 9a of a flexible diaphragm of rubber, rubberized fabric or the like indicated by reference numeral 9, the other or outer edge portion 9b of which is securely and hermetically held between an annular shoulder of the chamber 4 and the outer edge portion of a cup-shaped disk 10. The disk 10 is bolted to the end of the chamber 4 by means of bolts 11 and has a central aperture for communication of pneumatic pressure from the flexible supply line 12 to the adjacent side of the plunger.

Upon application of pneumatic pressure to the left side of the plunger, as viewed in Fig. 2 of the present drawing, there will be effective movement of the casing or chamber 4 towards the left since the plunger occupies fixed position upon the stationary rod 3 and since this movement is permitted by the flexible diaphragm 9.

Fixedly secured to the front end of the chamber 4 are rods 13 which carry a movable jaw 14 of the vise and which extend through the stationary jaw 1 so as to be guided in the movement of the jaw 14 towards and from the fixed jaw 1. Thus, as the casing or chamber 4 is moved towards the left, as viewed in Fig. 2, by the application of pneumatic pressure through the tubular connection, as above indicated, the jaw 14 will be moved therewith towards closed position with respect to the fixed jaw 1, such closed position of the jaw 14 being indicated by dotted lines in Fig. 1 of the present drawing and the work being indicated in a general way by reference letter W as being held between the jaws of the vise.

Then, upon release of the pneumatic pressure, a coil spring 15 will cause the casing or chamber 4 and the movable jaw 14 to be moved towards the right, as viewed in Fig. 2 of the present drawing. A stop collar 16 on the rod 3 will limit the extent of such return movement of the casing 4 therealong upon release of pneumatic pressure through the tube 12, as above explained.

This vise can be readily mounted upon various types of machines, as for instance milling machines (vertical and horizontal), drill presses, boring mills, shapers, etc.; and in each such installation, the cylinder or chamber and the stationary jaw are located upon the same side of the work with the convenience and safety incident thereto. There will be ensured perfect alignment between the stationary and movable jaws of the vise by virtue of the plurality of guide rods 13; and, by having clearance between the lower parts of the vise jaws, the chips that are cut from the work W and also the finished work itself may be permitted to drop from clamped position without any hindrance thereto. This device may be quickly and easily installed, removed and dismantled as it comprises only a few parts. Also, the pneumatic operating means is comparatively inexpensive; this device possesses high efficiency in operation; it is dependable; it is capable of long life of usefulness; and it precludes the necessity of frequent repair that is so characteristic of other such devices.

What I claim is:

1. A vise comprising fixed and movable jaws having co-operating clamping faces, means connected at its one end to said movable jaw and extending through said fixed jaw for supporting and guiding said movable jaw in straight-line movement, a reciprocable fluid pressure chamber mounted upon the other end of said supporting and guiding means for effecting movement thereof, a flexible diaphragm extending transversely within said chamber and having its outer edge anchored hermetically to the wall thereof, a rod extending axially through said chamber and hermetically connected at its one end to the central part of said diaphragm and connected at its other end to said fixed jaw, means for supporting said fixed jaw, and means for effecting movement of said chamber back and forth including means for supplying fluid pressure to the interior thereof and upon the opposite side of said diaphragm from said fixed jaw for effecting longitudinal movement of said chamber in one direction along said rod and for thereby effecting closing movement of said movable jaw therewith.

2. The same structure as recited in claim 1 hereof and with the addition of spring means within said chamber for automatically effecting opening movement of said movable jaw upon release of the fluid pressure.

3. The same structure as recited in claim 1 hereof and in which said means for supporting and guiding said movable jaw comprises a plurality of rods so as to ensure straight-line movement of said movable jaw towards and from said fixed jaw.

4. The same structure as recited in claim 1 hereof and in which said chamber is located upon the opposite side of said fixed jaw from its work-engaging face.

5. The same structure as recited in claim 1 hereof and with the addition of spring means within said chamber for automatically effecting opening movement of said movable jaw upon release of the fluid pressure, and stop means upon said rod for limiting the extent of movement of said chamber therealong upon release of the fluid pressure.

6. A vise comprising fixed and movable jaws having co-operating clamping faces, means connected at its one end to said movable jaw and extending through said fixed jaw for supporting and guiding said movable jaw in straight-line movement, a reciprocable fluid pressure chamber mounted upon the other end of said supporting and guiding means for effecting movement thereof, means for supporting said fixed jaw, a rod extending axially through said chamber and connected at its one end to said fixed jaw and being provided at its other end with a plunger disk of less diameter than that of the interior of said chamber, a flexible diaphragm hermetically connected at its inner edge to said plunger disk and at its outer edge to the wall of said chamber, and means for effecting back and forth straight-line movement of said chamber along said rod including means for supplying fluid pressure to the interior of said chamber upon the opposite side of said plunger disk from said fixed jaw for effecting closing movement of said movable jaw with respect to said fixed jaw.

ROY I. KAUFMAN.

References Cited in the file of this patent

UNITED STATES PATENTS

| Number | Name | Date |
|---|---|---|
| 1,430,226 | Goodreau | Sept. 26, 1922 |
| 1,827,258 | Payzant | Oct. 13, 1931 |
| 2,107,970 | Wells | Feb. 8, 1938 |
| 2,134,072 | Christensen | Oct. 25, 1938 |
| 2,444,304 | Miller | June 29, 1948 |